(12) United States Patent
Pouchak et al.

(10) Patent No.: US 11,774,127 B2
(45) Date of Patent: Oct. 3, 2023

(54) BUILDING SYSTEM CONTROLLER WITH MULTIPLE EQUIPMENT FAILSAFE MODES

(71) Applicant: Honeywell International Inc., Charlotte, NC (US)

(72) Inventors: Michael A. Pouchak, St. Anthony, MN (US); Peter Lehman, Excelsior, MN (US); Lou Jones, Dayton, NV (US); Todd D. Kreft, Brooklyn Park, MN (US); Ravi Bharathi Krishnan, Bangalore (IN); John Hutchey, North Las Vegas, NV (US)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 14 days.

(21) Appl. No.: 17/348,111

(22) Filed: Jun. 15, 2021

(65) Prior Publication Data

US 2022/0397299 A1    Dec. 15, 2022

(51) Int. Cl.
*F24F 11/37* (2018.01)
*F24F 11/49* (2018.01)
(Continued)

(52) U.S. Cl.
CPC .............. *F24F 11/37* (2018.01); *F24F 11/49* (2018.01); *F24F 11/65* (2018.01); *F24F 2140/60* (2018.01)

(58) Field of Classification Search
CPC .. F24F 11/37; F24F 11/49; F24F 11/65; F24F 2140/60; F24F 11/30
See application file for complete search history.

(56) References Cited

U.S. PATENT DOCUMENTS

| | | | |
|---|---|---|---|
| 4,745,542 A | | 5/1988 | Baba et al. |
| 4,765,150 A | * | 8/1988 | Persem ................ F04B 49/20 62/215 |

(Continued)

FOREIGN PATENT DOCUMENTS

| | | | |
|---|---|---|---|
| CN | 101354581 B | | 3/2011 |
| CN | 105864964 A | * | 8/2016 |

(Continued)

OTHER PUBLICATIONS

U.S. Appl. No. 16/436,859, filed Jun. 10, 2019.

(Continued)

*Primary Examiner* — Alicia M. Choi
(74) *Attorney, Agent, or Firm* — Seager, Tufte & Wickhem, LLP

(57) ABSTRACT

An HVAC controller provides control values to or more output ports of the HVAC controller. Operation of the HVAC controller is monitored for one or more irregularities. When one or more irregularities in the operation are identified, a hold mode is entered. The hold mode includes holding the one or more current control values on the one or more output ports of the HVAC controller until the one or more irregularities in the operation of the HVAC controller are corrected or a predetermined hold time expires, whichever occurs first. When the one or more irregularities in the operation of the HVAC controller are not corrected before the predetermined hold time expires, a back off mode is entered. The back off mode includes setting each of one or more control values on one or more output ports of the HVAC controller to a corresponding configurable back off value.

20 Claims, 14 Drawing Sheets

(51) Int. Cl.
*F24F 11/65* (2018.01)
*F24F 140/60* (2018.01)

(56) References Cited

U.S. PATENT DOCUMENTS

| | | | |
|---|---|---|---|
| 4,965,714 A | 10/1990 | Knecht | |
| 5,276,630 A * | 1/1994 | Baldwin | G05D 23/1917 |
| | | | 62/126 |
| 6,023,399 A | 2/2000 | Kogure | |
| 6,381,506 B1 | 4/2002 | Grappone | |
| 6,549,034 B1 | 4/2003 | Pietrzyk et al. | |
| 6,631,476 B1 | 10/2003 | Vandesteeg et al. | |
| 6,701,198 B1 | 3/2004 | Vandesteeg et al. | |
| 6,732,300 B1 | 5/2004 | Freydel | |
| 6,832,121 B1 | 12/2004 | Albrecht et al. | |
| 6,832,343 B2 | 12/2004 | Rupp et al. | |
| 6,891,850 B1 | 5/2005 | Vandesteeg et al. | |
| 6,909,923 B2 | 6/2005 | Vasko et al. | |
| 7,182,296 B2 * | 2/2007 | Yount | B64C 13/503 |
| | | | 244/175 |
| 7,269,465 B2 | 9/2007 | Esch et al. | |
| 7,472,106 B2 | 12/2008 | Muneta et al. | |
| 7,527,052 B2 | 5/2009 | Hickle et al. | |
| 7,556,238 B2 | 7/2009 | Seberger | |
| 7,653,459 B2 | 1/2010 | Pouchak et al. | |
| 7,738,972 B2 | 6/2010 | Pouchak | |
| 7,787,966 B2 | 8/2010 | Rotzler et al. | |
| 7,826,929 B2 | 11/2010 | Wacker | |
| 8,108,075 B2 | 1/2012 | Bohan, Jr. | |
| 8,112,162 B2 | 2/2012 | Pouchak et al. | |
| 8,149,554 B2 | 4/2012 | Pietrzyk et al. | |
| 8,169,097 B2 | 5/2012 | Weitkamp | |
| 8,184,417 B2 | 5/2012 | Pietrzyk et al. | |
| 8,239,500 B2 | 8/2012 | Pouchak | |
| 8,255,086 B2 | 8/2012 | Grohman | |
| 8,321,040 B2 | 11/2012 | Sachs et al. | |
| 8,335,573 B2 | 12/2012 | Buettner et al. | |
| 8,375,402 B2 | 2/2013 | Majewski et al. | |
| 8,418,128 B2 | 4/2013 | Pouchak et al. | |
| 8,560,094 B2 | 10/2013 | Ehrhart et al. | |
| 8,595,827 B2 | 11/2013 | Zondler et al. | |
| 8,650,306 B2 | 2/2014 | Pouchak | |
| 8,954,543 B2 | 2/2015 | Pouchak | |
| 8,963,632 B2 | 2/2015 | Schenk | |
| 9,459,619 B2 | 10/2016 | Fletcher et al. | |
| 9,696,058 B2 * | 7/2017 | Novotny | G05D 23/1904 |
| 9,726,392 B2 | 8/2017 | Wacker | |
| 10,200,203 B2 | 2/2019 | Jones et al. | |
| 10,234,840 B2 | 3/2019 | Daraiseh et al. | |
| 10,334,758 B1 * | 6/2019 | Ramirez | H05K 7/20945 |
| 10,539,993 B2 * | 1/2020 | Goodward | G06F 1/20 |
| 2003/0208283 A1 | 11/2003 | Vasko et al. | |
| 2004/0010732 A1 | 1/2004 | Oka | |
| 2004/0210620 A1 | 10/2004 | Muneta et al. | |
| 2005/0060605 A1 | 3/2005 | Gibart et al. | |
| 2005/0060606 A1 | 3/2005 | Kalan et al. | |
| 2005/0091410 A1 | 4/2005 | Gibart et al. | |
| 2005/0109395 A1 | 5/2005 | Seberger | |
| 2005/0149207 A1 | 7/2005 | Esch et al. | |
| 2006/0253734 A1 | 11/2006 | Oka | |
| 2007/0018127 A1 | 1/2007 | Seberger | |
| 2007/0124115 A1 | 5/2007 | Buttner et al. | |
| 2007/0168077 A1 | 7/2007 | Schuster | |
| 2007/0176570 A1 * | 8/2007 | Bokusky | H02P 29/032 |
| | | | 318/466 |
| 2008/0221726 A1 | 9/2008 | Rotzler et al. | |
| 2008/0225457 A1 | 9/2008 | Korrek | |
| 2009/0171472 A1 | 7/2009 | Teranisi et al. | |
| 2009/0324428 A1 * | 12/2009 | Tolbert, Jr. | F04B 39/0207 |
| | | | 417/44.1 |
| 2010/0106315 A1 * | 4/2010 | Grohman | F24F 11/30 |
| | | | 700/276 |
| 2010/0125372 A1 | 5/2010 | Pietrzyk et al. | |
| 2011/0071672 A1 | 3/2011 | Sanders et al. | |
| 2011/0153033 A1 * | 6/2011 | Walter | G05B 15/02 |
| | | | 700/16 |
| 2011/0239683 A1 * | 10/2011 | Czamara | H05K 7/20745 |
| | | | 62/259.4 |
| 2012/0005748 A1 | 1/2012 | Zondler et al. | |
| 2012/0016495 A1 | 1/2012 | Zondler et al. | |
| 2012/0022671 A1 | 1/2012 | Sachs et al. | |
| 2014/0189379 A1 * | 7/2014 | Faulkner | G06F 1/263 |
| | | | 713/300 |
| 2015/0057817 A1 | 2/2015 | Endrizzi et al. | |
| 2015/0212714 A1 | 7/2015 | Hua et al. | |
| 2015/0345813 A1 * | 12/2015 | Rite | F24F 11/84 |
| | | | 62/208 |
| 2016/0091903 A1 | 3/2016 | Patton et al. | |
| 2016/0313023 A1 * | 10/2016 | Przybylski | F24F 11/63 |
| 2017/0315522 A1 | 11/2017 | Kwon et al. | |
| 2020/0333035 A1 | 10/2020 | Nakahara | |
| 2020/0386436 A1 | 12/2020 | Pouchak et al. | |
| 2020/0387123 A1 | 12/2020 | Wacker et al. | |
| 2020/0387130 A1 | 12/2020 | Ferraro et al. | |
| 2020/0389365 A1 | 12/2020 | Pouchak et al. | |
| 2021/0088243 A1 * | 3/2021 | Goel | F24F 11/65 |
| 2021/0254847 A1 * | 8/2021 | Hern | F24F 11/84 |

FOREIGN PATENT DOCUMENTS

| | | | | |
|---|---|---|---|---|
| CN | 107965884 A | * | 4/2018 | |
| CN | 108759035 A | * | 11/2018 | F24F 11/38 |

OTHER PUBLICATIONS

European Search Report for Application No. 20179390.8-1218 dated Oct. 28, 2020.

Extended European Search Report, European Patent Application No. 22177367.4, EP Patent Office, dated Nov. 16, 2022 (10 pages).

* cited by examiner

BUILDING SYSTEM CONTROLLER WITH MULTIPLE EQUIPMENT FAILSAFE MODES

TECHNICAL FIELD

The present disclosure pertains generally to building control systems and more particularly to methods and systems for providing failsafe operation of such building control systems.

BACKGROUND

Building control systems are often used to help control a building's environment, such as temperature, humidity, air quality, lighting, security and/or other aspects of a building's environment. An example building control system may include a Heating, Ventilation, and/or Air Conditioning (HVAC) system used to control the comfort level within a building. Such HVAC systems typically includes one or more HVAC controllers that control various HVAC components of the HVAC system in order to affect and/or control one or more environmental conditions within the building. Alternatively, or in addition, a building control system may include a lighting control system that includes one or more lighting controllers that control various lighting components of the building. Alternatively, or in addition, a building control system may include a security system that includes one or more security controllers that control various security components of the building. These are just examples. A need remains for improved building controllers.

SUMMARY

This disclosure relates generally to building controllers such as HVAC controllers. An example of the disclosure includes a method for controlling one or more output ports of an HVAC controller. The illustrative method includes, in an operational mode, applying control values to the one or more output ports of the HVAC controller to control one or more HVAC components of an HVAC system. One or more current control values that are currently being applied by the HVAC controller to one or more output ports of the HVAC controller are stored. Operation of the HVAC controller is monitored for one or more irregularities. When one or more irregularities in the operation of the HVAC controller are identified, a hold mode is entered. The hold mode includes holding the one or more current control values on the one or more output ports of the HVAC controller until the one or more irregularities in the operation of the HVAC controller are corrected or a predetermined hold time expires, whichever occurs first. When the one or more irregularities in the operation of the HVAC controller are not corrected before the predetermined hold time expires, a back off mode is entered. The back off mode includes setting each of one or more control values on one or more output ports of the HVAC controller to a corresponding configurable back off value.

Another example of the disclosure is an HVAC controller having one or more output ports for controlling one or more HVAC components of an HVAC system. The illustrative HVAC controller includes one or more processors. The one or more processors are configured to, when in an operational mode, apply control values to one or more output ports of the HVAC controller to control one or more HVAC components of an HVAC system and to store one or more current control values that are currently being applied by the HVAC controller to one or more output ports of the HVAC controller. The one or more processors are configured to monitor the operation of the HVAC controller for one or more irregularities. When one or more irregularities in the operation of the HVAC controller are identified, the one or more processors are configured to enter a hold mode. While in the hold mode, the one or more current control values on the one or more output ports of the HVAC controller are held until the one or more irregularities in the operation of the HVAC controller are corrected or a predetermined hold time expires, whichever occurs first. When the one or more irregularities in the operation of the HVAC controller are not corrected before the predetermined hold time expires, the one or more processors are configured to enter a back off mode. While in the back off mode, the one or more processors are configured to set each of one or more control values on one or more output ports of the HVAC controller to a corresponding configurable back off value.

Another example of the disclosure is an HVAC controller having one or more output ports for controlling one or more HVAC components of an HVAC system. The illustrative HVAC controller includes one or more processors. The one or more processors are configured to, when in an operational mode, apply control values to one or more output ports of the HVAC controller to control one or more HVAC components of an HVAC system and to store one or more current control values that are currently being applied by the HVAC controller to one or more output ports of the HVAC controller. The one or more processors are configured to monitor the operation of the HVAC controller for one or more irregularities. When one or more irregularities in the operation of the HVAC controller are identified, the one or more processors are configured to enter a hold mode. While in the hold mode, a first set of one or more control values are set and held on the one or more output ports of the HVAC controller are held until the one or more irregularities in the operation of the HVAC controller are corrected or a predetermined hold time expires, whichever occurs first. When the one or more irregularities in the operation of the HVAC controller are not corrected before the predetermined hold time expires, the one or more processors are configured to enter a back off mode. While in the back off mode, the one or more processors are configured to set each of one or more control values on one or more output ports of the HVAC controller to a corresponding configurable back off value.

Another example of the disclosure includes a non-transitory computer readable medium storing instructions for execution by one or more processors of an HVAC controller. When the instructions are executed by the one or more processors of the HVAC controller, the one or more processors are caused to, in an operational mode, apply control values to one or more output ports of the HVAC controller to control one or more HVAC components of an HVAC system. The one or more processors are further caused to store one or more current control values that are currently being applied by the HVAC controller to one or more output ports of the HVAC controller and to monitor the operation of the HVAC controller for one or more irregularities. When one or more irregularities in the operation of the HVAC controller are identified, the one or more processors are caused to enter a hold mode. While in the hold mode, the one or more processors are caused to hold the one or more current control values on the one or more output ports of the HVAC controller until the one or more irregularities in the operation of the HVAC controller are corrected or a predetermined hold time expires, whichever occurs first. When the one or more irregularities in the operation of the HVAC controller are not corrected before the predetermined hold time expires, the one or more processors are caused to enter a back off mode. While in the back off mode, the one or more processors are caused to set each of one or more control values on one or more output ports of the HVAC controller to a corresponding configurable back off value.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments of the disclosure in connection with the accompanying drawings, in which.

Figure 1:
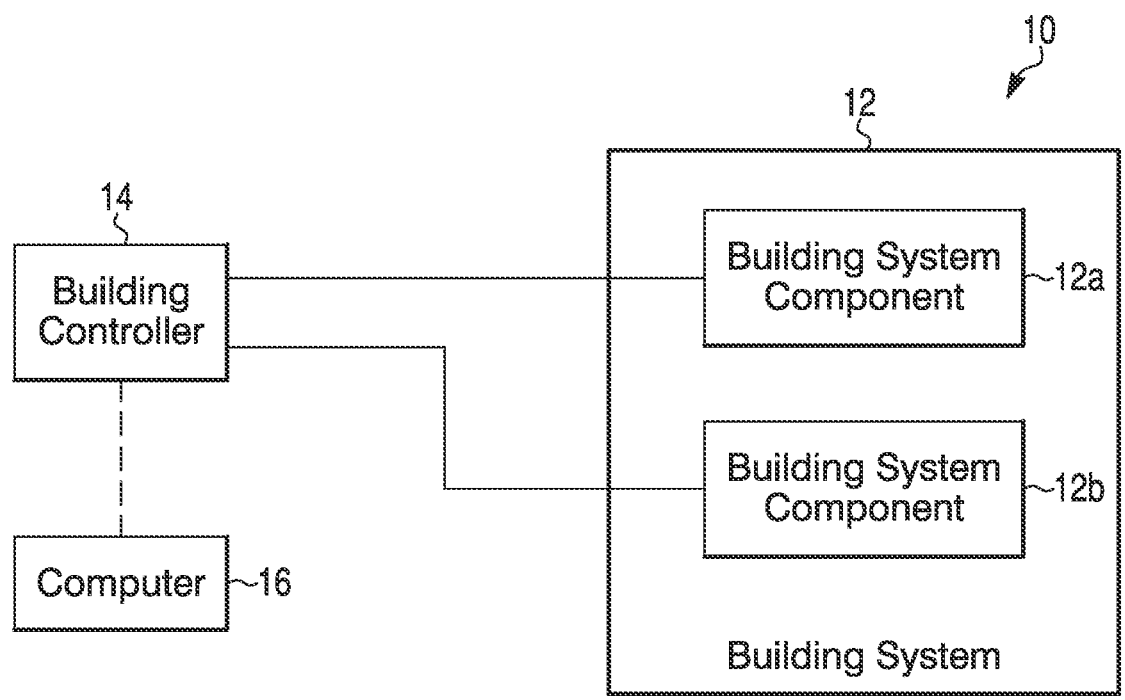
FIG. 1 is a schematic block diagram of an illustrative building control system.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram of an illustrative building control system 10. The building control system 10 includes a building system 12 and a building controller 14 that is configured to control operation of at least part of the building system 12. The building system 12 is shown as including a building system component 12a and a building system component 12b. It will be appreciated that this is merely illustrative, as the building system 12 may have any number of distinct building system components, and likely has a large number of distinct building system components. The building system 12 may represent any number of different building systems or combination of building systems, such as but not limited to HVAC systems, lighting systems, security systems and/or any other suitable building system. For purposes of illustration, the building system 12 will be described herein with respect to an HVAC system, but the disclosure is not intended to be so limiting.

In some cases, the building control system 10 may include a computer 16. The computer 16 may be a desktop computer, a laptop computer, a tablet computer, a mobile phone or any other suitable computing device. The computer 16 may be disposed adjacent the building controller 14 for purposes of programming the building controller 14. In some instances, the computer 16 may be remotely located, or may represent a cloud-based server that is capable of communicating with the building controller 14. In some cases, the computer 16 may implement a programming desktop such as a function block wire sheet, in which function blocks may be dragged and dropped onto a wire screen, and the user may subsequently easily connect various inputs and outputs of the function blocks to program desired functions of the building controller 14. The software may translate the function blocks and related inputs and outputs for use by the building controller 14 in controlling operation of the building system 12. In some cases, the building controller 14 may execute a function block engine that is capable of executing code translated from the function block engine wire sheet. One such programming environment is implemented in the Niagara Framework™, available from Tridium Inc. of Richmond, Va.

Figure 2:
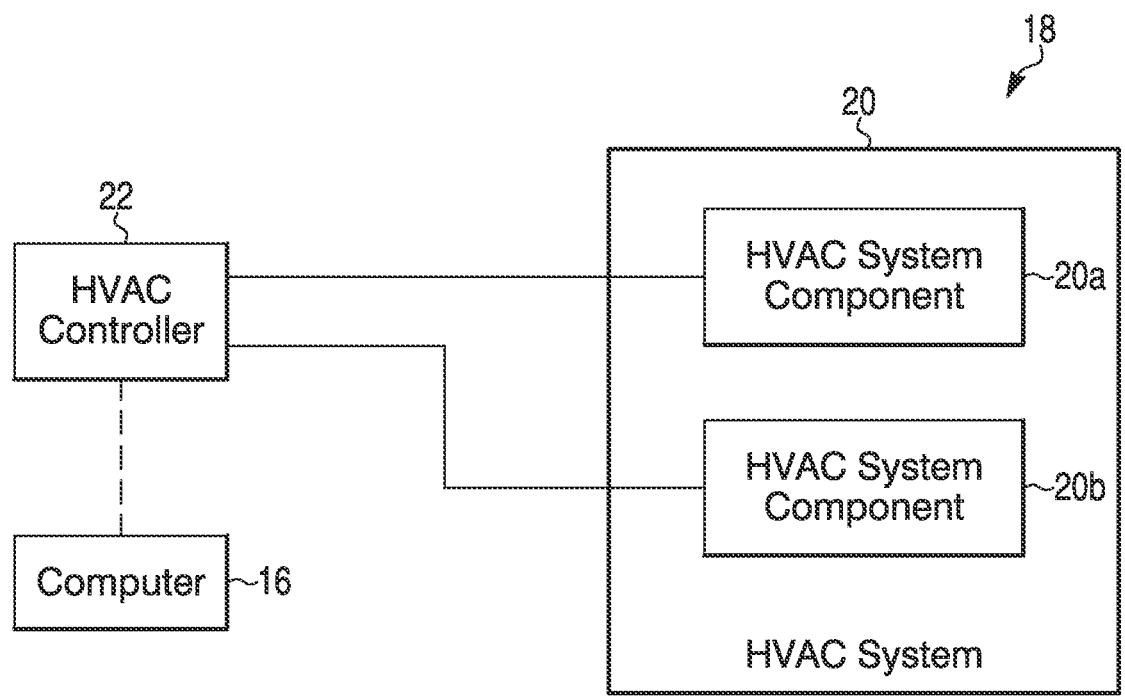
FIG. 2 is a schematic block diagram of an illustrative Heating, Ventilating and Air Conditioning (HVAC) system.

FIG. 2 is a schematic block diagram of an illustrative Heating, Ventilating and Air Conditioning (HVAC) control system 18 that may be considered as an example of the building control system 10. The control system 18 includes an HVAC system 20 and an HVAC controller 22 that is configured to control operation of at least part of the HVAC system 20. The HVAC system 20 is shown as including an HVAC component 20a and an HVAC system component 20b. It will be appreciated that this is merely illustrative, as the HVAC system 20 may have any number of distinct HVAC system components, and likely has a large number of distinct HVAC system components. The HVAC system 20 may include a variety of HVAC system components, such as but not limited to chillers, air handling units (AHUs), pumps and the like.

The computer 16 may be disposed adjacent the HVAC controller 22 for purposes of programming the HVAC controller 22. In some cases, the computer 16 may implement a programming desktop such as a function block wire sheet, in which function blocks may be dragged and dropped onto a wire screen, and the user may subsequently easily connect various inputs and outputs of the function blocks to program desired functions of the HVAC controller 22. The software may translate the function blocks and related inputs and outputs for use by the HVAC controller 22 in controlling operation of the HVAC system 20. In some cases, the HVAC controller 22 may execute a function block engine that is capable of executing code translated from the function block engine wire sheet. One such programming environment is implemented in the Niagara Framework™, available from Tridium Inc. of Richmond, Va.

Figure 3:
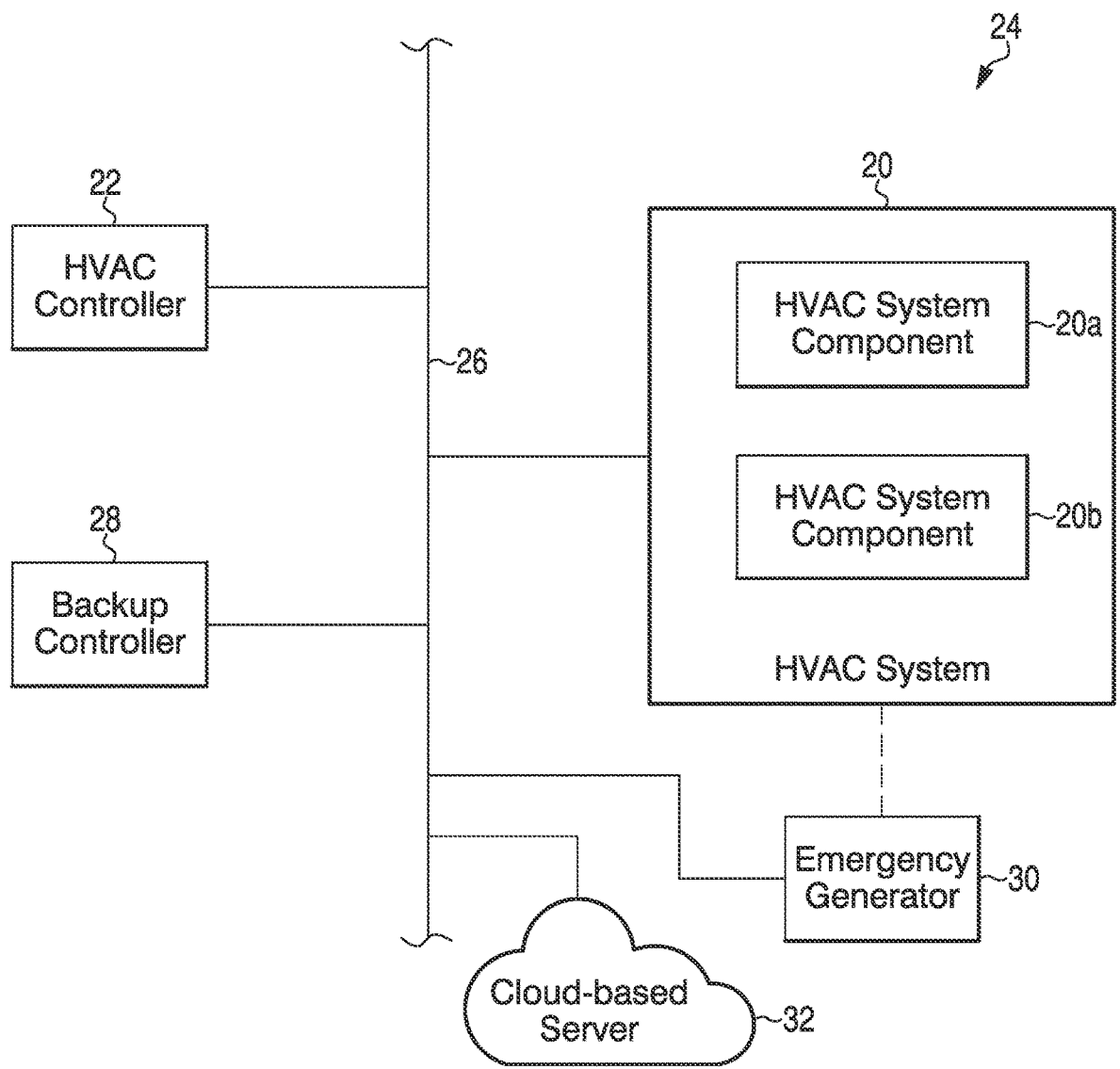
FIG. 3 is a schematic block diagram of an illustrative Heating, Ventilating and Air Conditioning (HVAC) system.

FIG. 3 is a schematic block diagram of an illustrative HVAC control system 24 in which the HVAC system 20 and the HVAC controller 22 are operably coupled together via a network 26. The network 26 may represent a WAN (wide area network) or a LAN (local area network), for example. The network 26 or portions thereof may represent a hard-wired network enabled via Ethernet cables, coaxial cables, fiber optic cables and the like. The network 26 or portions thereof may represent a wireless network using any of a variety of different wireless communication protocols. In some instances, the HVAC control system 24 may include one or more backup controller 28, although only a single backup controller 28 is illustrated. The backup controller 28 may have the same functionality as the HVAC controller 22, for example, and may be called into service if a problem develops with the HVAC controller 22. In some cases, the backup controller 28 may have limited functionality relative to that of the HVAC controller 22. The backup controller 28 may be a Spyder controller, for example. The backup controller 28 may include both an event driven controller and a deterministic controller. The backup controller 28 may only include a deterministic controller, for example.

The illustrative HVAC control system 24 of FIG. 3 includes an emergency generator 30. The emergency generator 30 may be called into action when there is an interruption of electrical power to one or more HVAC components within the HVAC system 20 and may provide emergency electrical power to one or more HVAC components within the HVAC system 20. The HVAC controller 22 may issue a command to bring the emergency generator 30 into operation. In some cases, depending on the severity of the issues facing the HVAC control system 24, it may be the backup controller 28 that issues the command to bring the emergency generator 30 into operation. There may be a cloud-based server 32 that monitors performance of the HVAC control system 24 and issues the command to bring the emergency generator 30 into operation. It will be appreciated that the functionality of the HVAC controller 22 may be distributed between one or more edge devices and the cloud-based server 32, for example.

Figure 4:
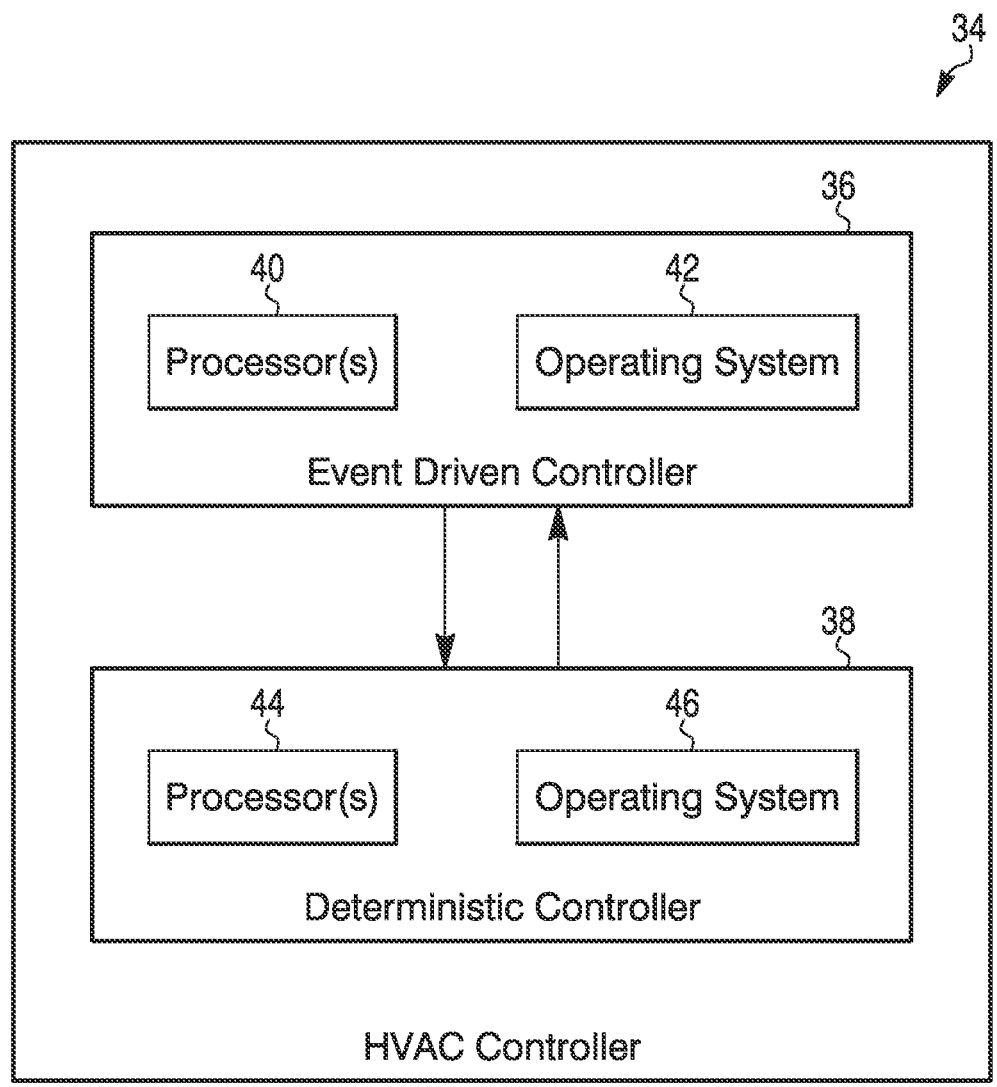
FIG. 4 is a schematic block diagram of an illustrative HVAC controller.

FIG. 4 is a schematic block diagram of an illustrative HVAC controller 34 that may be considered as an example of the HVAC controller 22 or even the building controller 14. The illustrative HVAC controller 34 of FIG. 4 includes an event driven controller 36 and a deterministic controller 38. The event driven controller 36 communicates with the deterministic controller 38. In some cases, the event driven controller 36 handles higher level functions of the HVAC controller 34, including determining output commands, while the deterministic controller 38 receives and implements the determined output commands from the event driven controller 36. The event driven controller 36 may, for example, provide a function block engine that is capable of executing code translated from the function block engine wire sheet. One such programming environment is implemented in the Niagara Framework™, available from Tridium Inc. of Richmond, Va. In one example, the event driven controller 36 may, in response to a detected event such as the beginning of a new schedule period of a programmed schedule, determine that a new setpoint should be initiated according to a programmed schedule and send the new setpoint to the deterministic controller 38. The deterministic controller 38 may then begin using the new setpoint when controlling the HVAC equipment. In one particular example, the deterministic controller 38 may receive a temperature reading from a temperature sensor in a controlled space, and may cycle a heater that services the controlled space in a closed loop and deterministic manner to maintain the new setpoint in the controlled space.

While the HVAC controller 34 is illustrated as including both the event driven controller 36 and the deterministic controller 38, it will be appreciated that in some cases, the HVAC controller 34 may include only the event driven controller 36 or only the deterministic controller 38. In some cases, the HVAC controller 34 may include a first event driven controller and a second event driven controller. In some instances, the HVAC controller 34 may include a first deterministic controller and a second deterministic controller. The event driven controller 36 includes one or more processors 40 and an operating system 42. The deterministic controller 38 may include one or more processor 44 and an operating system 46. In some cases, the operating system 46 may be different from the operating system 42. Communication between the event driven controller 36 and the deterministic controller 38 may include a periodic heartbeat message to function as a watchdog.

Figure 5:
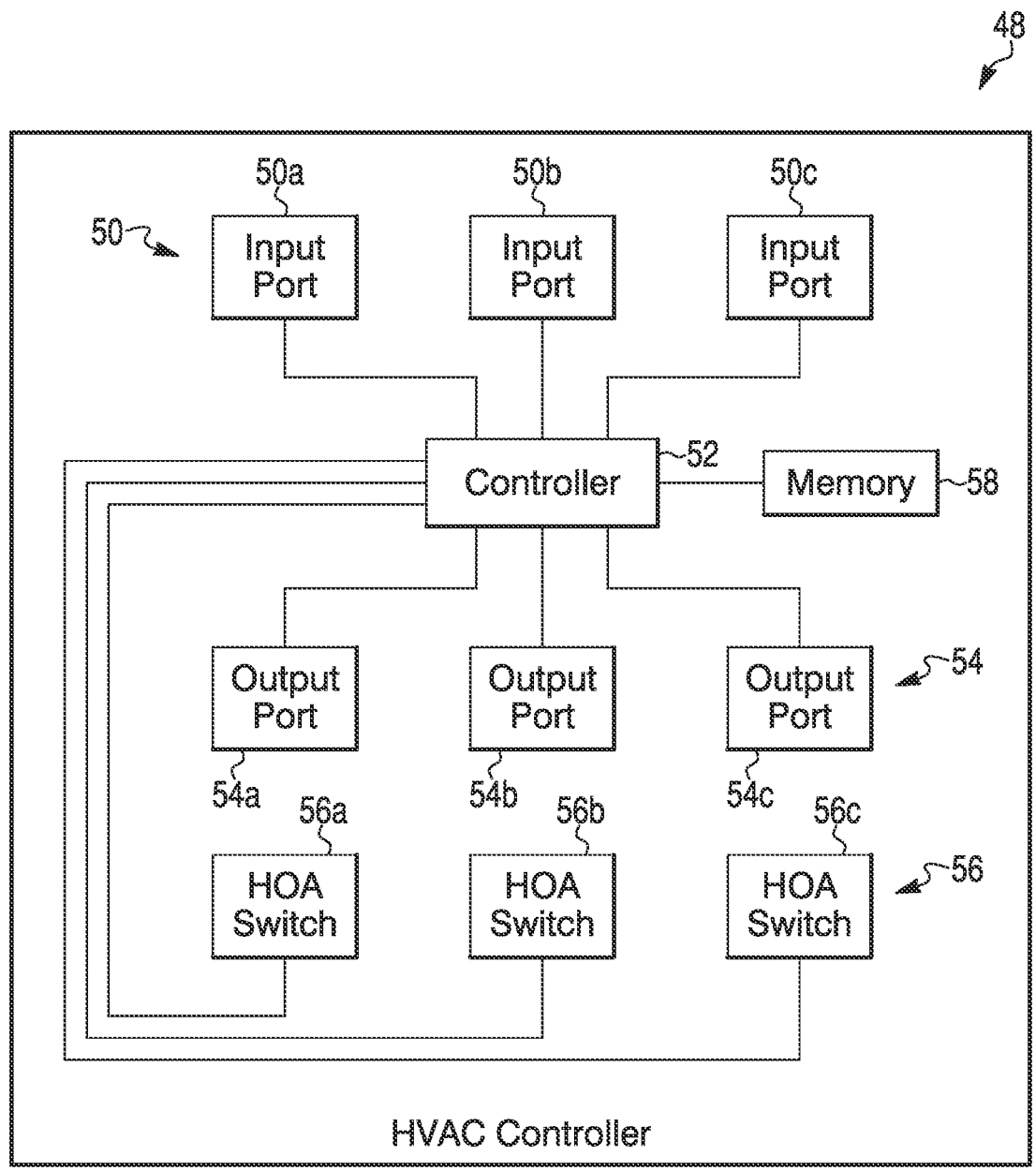
FIG. 5 is a schematic block diagram of an illustrative HVAC controller.

FIG. 5 is a schematic block diagram of an illustrative HVAC controller 48. The HVAC controller 48 may be considered as being an example of the HVAC controller 34, the HVAC controller 22 or even the building controller 14. The HVAC controller 48 includes a number of input ports 50. The input ports 50 are individually labeled as 50a, 50b, 50c. While a total of three input ports 50 are shown, this is merely illustrative as the HVAC controller 48 may include any number of input ports 50. The input ports 50 are operably coupled with a controller 52, and each of the input ports 50 may be considered as being configured to be wired to an output of an HVAC system component such as an HVAC system sensor or other HVAC system component.

The HVAC controller 48 includes a number of output ports 54. The output ports 54 are individually labeled as 54a, 54b, 54c. While a total of three output ports 54 are shown, this is merely illustrative as the HVAC controller 48 may include any number of output ports 54. Each of the output ports 54 are operably coupled with the controller 52 such that the controller 52 outputs the one or more control commands to one or more HVAC system components via the output ports 54. The control commands or control signals control operation of the HVAC system components being controlled by the HVAC controller 48.

In some cases, the HVAC controller 48 also includes a plurality of manually-actuated HAND-OFF-AUTO (HOA) switches 56, individually labeled as 56a, 56b, 56c. While a total of three HOA switches 56 are shown, it will be appreciated that this is merely illustrative, as the HVAC controller 48 may include any number of HOA switches 56. Each of the plurality of HOA switches 56 may be considered as being associated with a corresponding one of the output ports 54. Each of the HOA switches 56 are operatively coupled to the controller 52. In some cases, the control signals outputted by the controller 52 via a particular one of the plurality of output ports 54 may be influenced by whether a corresponding one of the plurality of HOA switches 56 is in its HAND (H) position, its OFF (O) position or its AUTO (A) position. The illustrative HVAC controller 48 also includes a memory such as a non-volatile memory 58.

controller 52 may be configured to enter a back off mode in which the controller 52 may set each of one or more control values on one or more output ports of the HVAC controller to a corresponding configurable back off value.

Table 1 below provides illustrative but non-limiting examples of hold times, hold values and back off values for a variety of different HVAC components:

TABLE ONE

| Device | Description | Normal Value | Hold Time | Hold Value | Back Off Time | Back Off Value |
|---|---|---|---|---|---|---|
| chiller | analog value | 20-100% | 2 minutes | 30% | 60 minutes | 25% |
| boiler | analog value | 20-100% | 15 seconds | 30% | 15 minutes | 20% |
| fan | on/off | on | 30 seconds | on | 20 minutes | on |
| fan | analog value | 20-100% | 30 seconds | 40% | 10 minutes | 30% |
| DX compressor | on/off | on | 30 seconds | on | 5 minutes | on |
| hot water valve | on/off | on | 60 seconds | on | 5 minutes | on |
| hot water valve | analog value | 0-100% | 60 seconds | 50% | 10 minutes | 20% |
| steam valve | on/off | on | 45 seconds | on | 5 minutes | on |
| RTU fan | on | on | 60 seconds | on | 10 minutes | on |
| RTU airflow | fan static | 0-100% | 40 seconds | 50% | 10 minutes | 40% |

The controller 52, which may be considered as including one or more processors, may be configured to apply control values to one or more of the output ports 54 of the HVAC controller 48 in order to control one or more HVAC components of an HVAC system such as the HVAC system 20 while in an operational mode. The controller 52 may be configured to store one or more current control values that are currently being applied by the HVAC controller 48 to one or more output ports 54 of the HVAC controller 48, such as within the memory 58. The controller 52 may be configured to monitor the operation of the HVAC controller 48 for one or more irregularities. Irregularities may include an irregularity within internal communication within the HVAC controller 48. As an example, this may include a disruption or other irregularity in communication between the event driven controller 36 and the deterministic controller 38, should the HVAC controller 48 include these components. Irregularities may also include the event driven controller 36 not providing the periodic heartbeat message in an expected manner. Irregularities may also include all or part of the HVAC controller issuing an alert, issuing an error flag, experiencing a crash (operating system, BIOS, and/or an application program), and/or the HVAC controller is otherwise not behaving as expected.

When one or more irregularities in the operation of the HVAC controller 48 are identified, the controller 52 may be configured to enter a hold mode. While in the hold mode, the controller 52 may be configured to set and hold a first set of one or more control values on the one or more output ports 54 of the HVAC controller 48 until the one or more irregularities in the operation of the HVAC controller 48 are corrected or a predetermined hold time expires, whichever occurs first. This allows the HVAC components to maintain or hold their current operation for a period of time hoping that the irregularity resolves itself. For example, the event driven controller may crash, and automatically reset itself and begin operating normally before the predetermined hold time expires. In some cases, even during a reset of the HVAC controller 48, a reboot, a reset of an application program, or during another irregular event, the hold mode maintains the outputs in their held state. When the one or more irregularities in the operation of the HVAC controller 48 are not corrected before the predetermined hold time expires, the In Table 1, the hold values represent an example current value of a corresponding output port storing in memory. That is, when the irregular event was detected, the chiller control output had a value of 30%. This value was stored in memory and is held for 2 minutes, hoping that the irregularity will resolve itself. This will keep the chiller energized at its current output for 2 minutes. If the setpoint was just about satisfied just before the irregular event, this may cause the temperature in the space to fall below the setpoint for the space. Because of this reason, it may be undesirable to maintain the current hold value for too long of a time. As such, when the one or more irregularities in the operation of the HVAC controller 48 are not corrected before the predetermined hold time expires, the controller 52 may be configured to enter the back off mode in which the controller 52 may set each of one or more control values on one or more output ports of the HVAC controller to a corresponding configurable back off value. In the case of the chiller in Table 1, the chiller control signal would be backed off from 30% to 25%. In some cases, even during a reset of the HVAC controller 48, a reboot, a reset of an application program, or during another irregular event, the back off mode maintains the outputs in their back off state. In some cases, if power is removed from the HVAC controller 48 and then power is restored, the HVAC controller 48 may boot up into the back off mode with the outputs in their configurable back off values.

In some cases, and for some outputs such as an output used to engage the emergency generator, the hold mode may include setting and/or triggering one or more output ports of the HVAC controller. For example, the hold mode may include the controller 52 sending a signal to the emergency generator 30 when a power failure has affected operation of one or more HVAC components of the HVAC system. The hold mode may additionally or alternatively include the controller 52 sending a signal requesting that an emergency controller (such as the backup controller 28) that is configured to provide the first set of one or more control values proceed with providing the first set of one or more control values. These are not shown in Table 1.

In some cases, when in the hold mode and the one or more irregularities in the operation of the HVAC controller 48 are corrected before the predetermined hold time expires, the controller 52 may return to the operational mode. Similarly, if the one or more irregularities in the operation of the HVAC controller 48 are corrected while in the back off mode, the controller 52 may return to the operational mode. In some instances, the hold mode may have a predetermined hold time that is set equal to zero, meaning that when an irregularity in operation of the HVAC controller 48 is detected, the HVAC controller 48 immediately enters the back off mode.

The HVAC controller 48 may include, as shown for example in the HVAC controller 34 of FIG. 4, both an event driven controller (such as the event driven controller 36) and a deterministic controller (such as the deterministic controller 38). The deterministic controller may be in communication with and receive control inputs from the even driven controller. In turn, the deterministic controller may apply the control values to the one or more output ports 54 of the HVAC controller 48. In some cases, the deterministic controller may be implemented on a different printed circuit board than the event driven controller, with a communication path extending therebetween, and monitoring the operation of the HVAC controller 48 for one or more irregularities may include monitoring for a heartbeat signal on the communication path.

Figure 6:
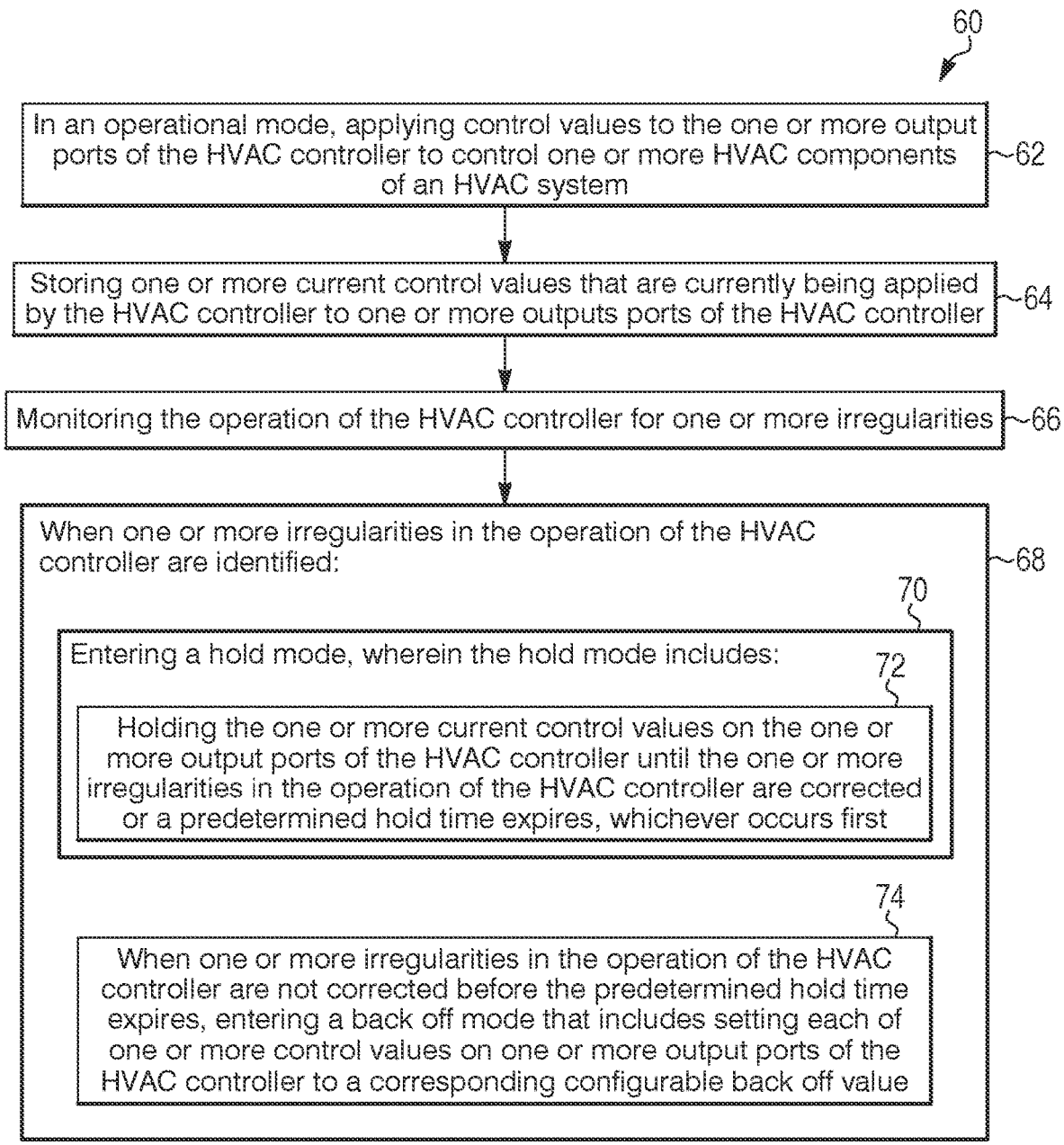
FIG. 6 is a flow diagram showing an illustrative method.

FIG. 6 is a flow diagram showing an illustrative method 60 for controlling one or more output ports (such as the output ports 54) of an HVAC controller (such as the HVAC controller 48). The illustrative method 60 includes, in an operational mode, applying control values to the one or more output ports of the HVAC controller to control one or more HVAC components of an HVAC system as indicated at block 62. One or more current control values that are currently being applied by the HVAC controller to one or more output ports of the HVAC controller are stored, as indicated at block 64. The operation of the HVAC controller is monitored for one or more irregularities, as indicated at block 66. When one or more irregularities in the operation of the HVAC controller are identified, as indicated at block 68, a hold mode is entered, as indicated at block 70. The hold mode includes holding the one or more current control values on the one or more output ports of the HVAC controller until the one or more irregularities in the operation of the HVAC controller are corrected or a predetermined hold time expires, whichever occurs first, as indicated at block 72. When the one or more irregularities in the operation of the HVAC controller are not corrected before the predetermined hold time expires, a back off mode is entered that includes setting each of one or more control values on one or more output ports of the HVAC controller to a corresponding configurable back off value, as indicated at block 74.

In some instances, when in the hold mode and the one or more irregularities in the operation of the HVAC controller are corrected before the predetermined hold time expires, the HVAC controller 48 returns to the operational mode. When in the back off mode, and the one or more irregularities in the operation of the HVAC controller are corrected, the HVAC controller 48 returns to the operational mode.

In some cases, the HVAC controller 48 may include an event driven controller (such as the event driven controller 36) and a deterministic controller (such as the deterministic controller 38). The deterministic controller may be in communication with and receive control inputs from the event driven controller and in turn may apply the control values to the one or more output ports of the HVAC controller. The one or more irregularities may include an irregularity within the even driven controller. The one or more irregularities may include an irregularity within the deterministic controller. The one or more irregularities may include an irregularity in the communication between the event driven controller and the deterministic controller. The HVAC controller 48 may be a distributed controller, with operational control located within the cloud.

In some cases, the HVAC controller 48 may include a first event driven controller and a second event driven controller, wherein the second event driven controller is in communication with and receives control inputs from the first event driven controller and in turn applies the control values to the one or more output ports of the HVAC controller. In some instances, the HVAC controller 48 may include a first deterministic controller and a second deterministic controller, wherein the second deterministic controller is in communication with and receives control inputs from the first deterministic controller and in turn applies the control values to the one or more output ports of the HVAC controller. The HVAC controller 48 may include a monolithic controller. The HVAC controller 48 may include a distributed controller, with operational control of the HVAC controller 48 located within a cloud, such as but not limited to the cloud-based server 32.

When in the held or back off mode, the one or more HOA switches 56 may be manually switchable to an "H" or "O" setting to manually overriding the hold and/or back off value on one or more of the output ports of the HVAC controller. In some cases, a control value associated with the "H" setting of at least one of the HOA switches for overriding the hold and/or configurable back off value of one or more of the output ports of the HVAC controller may be programmable. In some cases, even during a reset of the HVAC controller 48, a reboot, a reset of an application program, or during another irregular event, the manual override values of the HOA switches may be maintained on the corresponding outputs.

Figure 7:
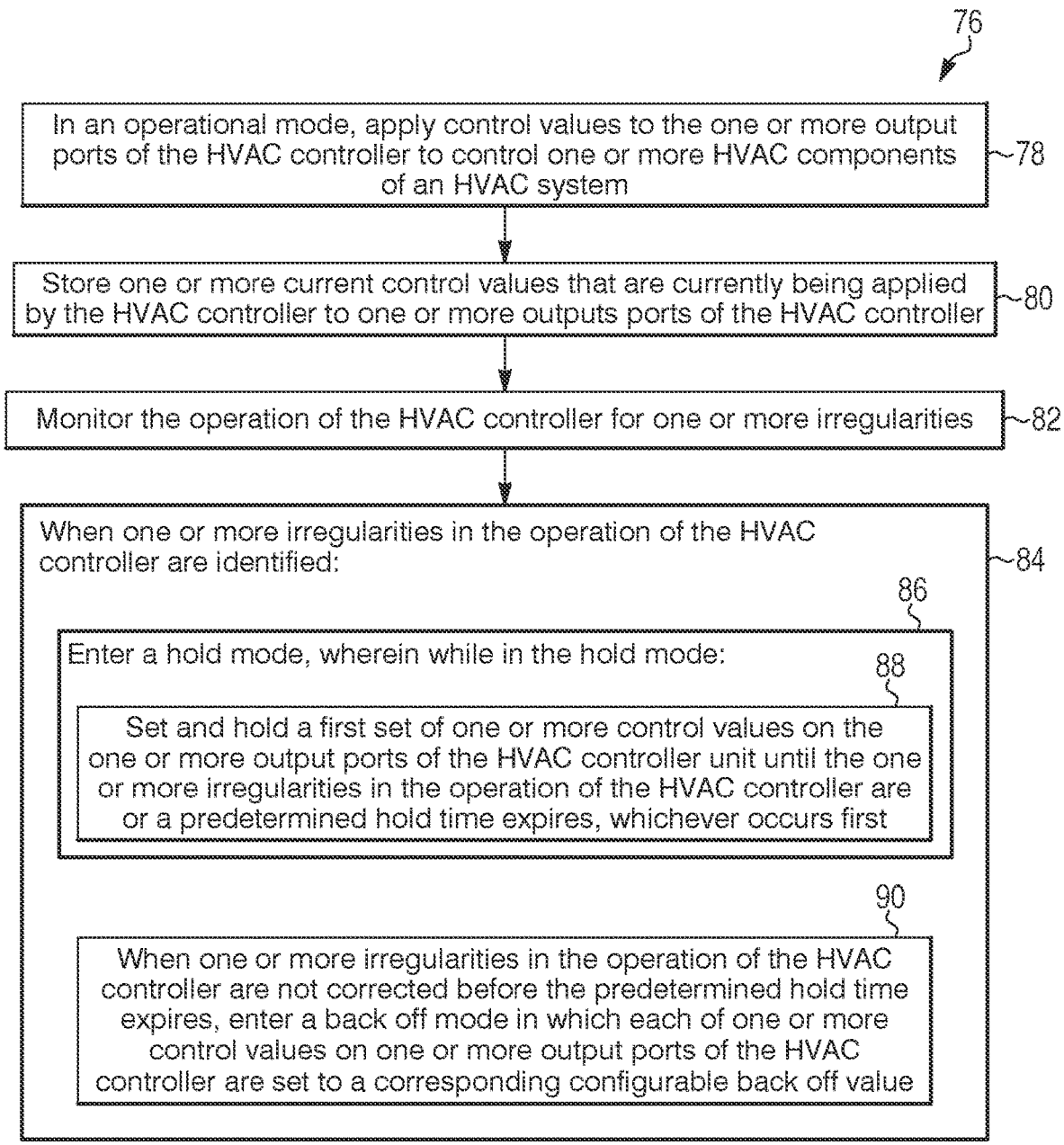
FIG. 7 is a flow diagram showing an illustrative method.

FIG. 7 is a flow diagram showing an illustrative method 76 for controlling one or more output ports (such as the output ports 54) of an HVAC controller (such as the HVAC controller 48). The illustrative method 76 includes, in an operational mode, applying control values to the one or more output ports of the HVAC controller to control one or more HVAC components of an HVAC system as indicated at block 78. One or more current control values that are currently being applied by the HVAC controller to one or more output ports of the HVAC controller are stored, as indicated at block 80. The operation of the HVAC controller is monitored for one or more irregularities, as indicated at block 82. When one or more irregularities in the operation of the HVAC controller are identified, as indicated at block 84, a hold mode is entered, as indicated at block 86. The hold mode includes setting and holding a first set of one or more control values on the one or more output ports of the HVAC controller until the one or more irregularities in the operation of the HVAC controller are corrected or a predetermined hold time expires, whichever occurs first, as indicated at block 88. When the one or more irregularities in the operation of the HVAC controller are not corrected before the predetermined hold time expires, a back off mode is entered that includes setting each of one or more control values on one or more output ports of the HVAC controller to a corresponding configurable back off value, as indicated at block 90.

Figure 8:
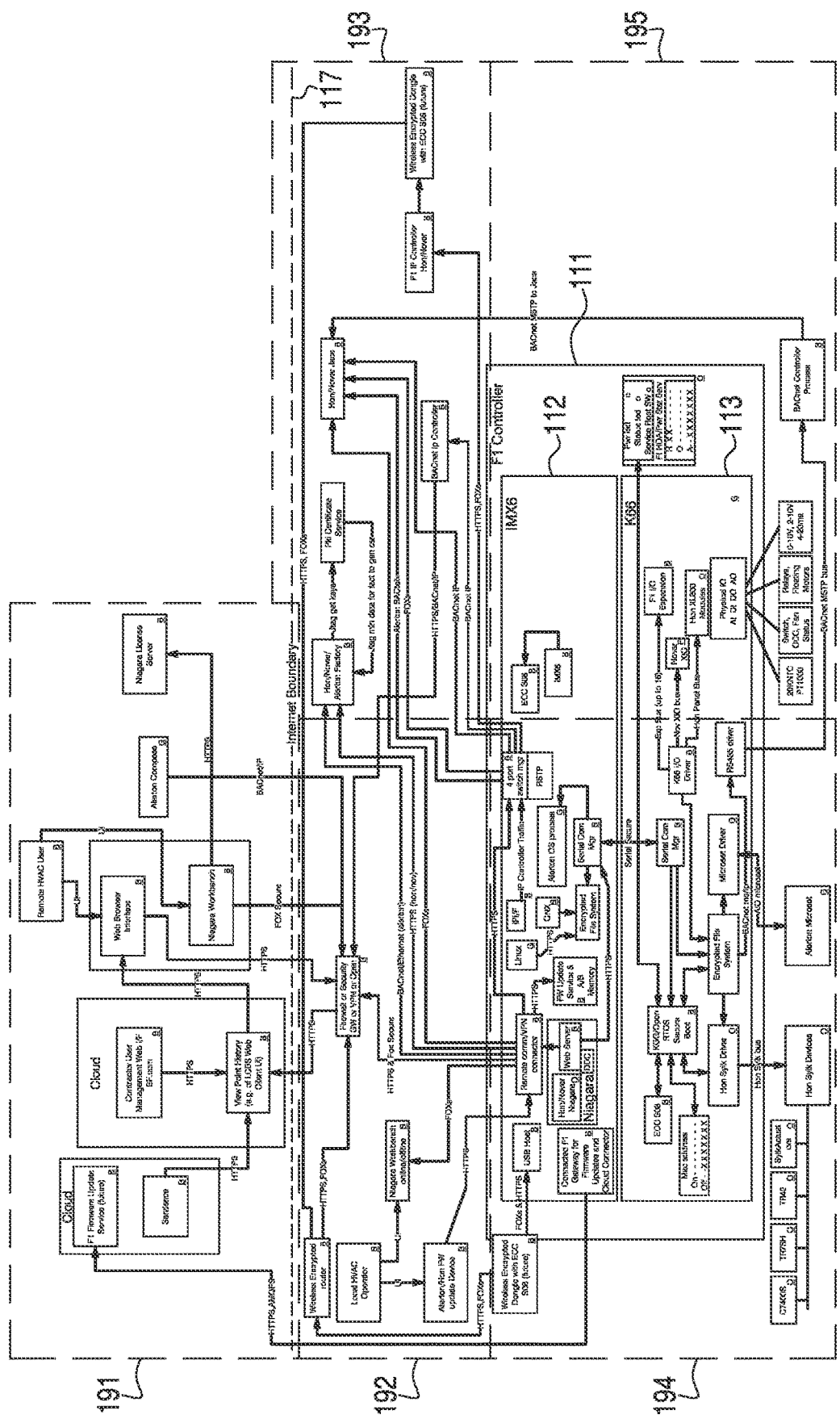
FIG. 8 is a diagram of an illustrative system and approach.
Figure 9A:
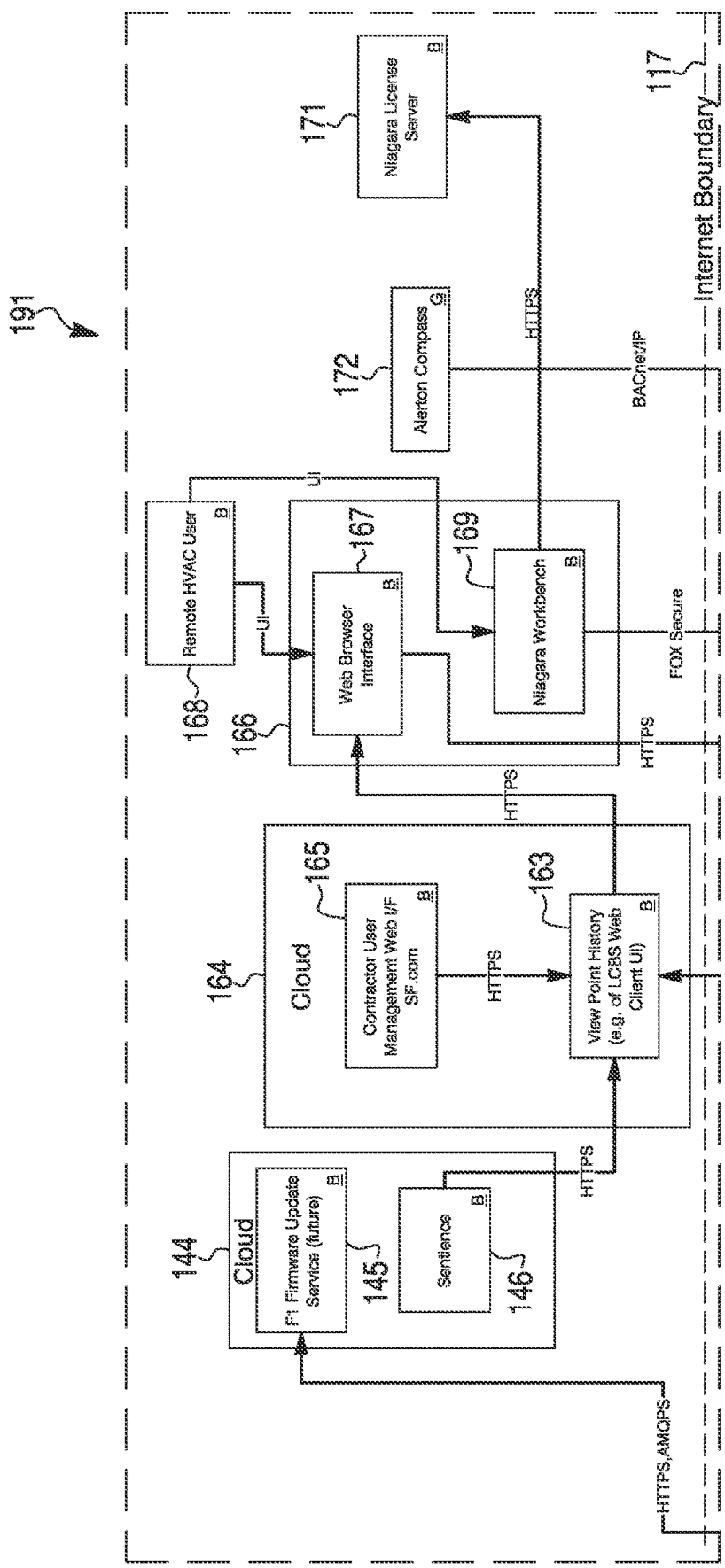
FIGS. 9A, 9B, 9C, 9D and 9E are diagrams of enlarged portions from FIG. 8.

FIG. 8 is a diagram of a summary view of a controller 111 and associated components. The controller 111 may be an example implementation of one or more of the building controller 14, HVAC controller 22, HVAC controller 22, HVAC controller 34 and HVAC controller 48. FIGS. 9A, 9B, 9C, 9D and 9E show portions 191, 192, 193, 194 and 195, respectfully of FIG. 8. FIGS. 9D and 9E show portions 194 and 195, respectfully, revealing that controller 111 may have a card or board 112 and a card or board 113. There may be just one board or more than two boards. For illustrative purposes, there may be two boards. Card 112 may have a 4-port switch 114 having a speed of one or more Gbps. Port switch 114 may have a hypertext transfer protocol secure (HTTPS) input from a remote comm/virtual private network (VPN) connector 115. Connector 115 may also have an input of IP controller traffic from IP interface (I/F) 116. Two other ports of switch may be connected outside of controller 111 and across an internet boundary 117. Remote comm/VPN 115 may have connections outside of controller 111.

A Niagara component 118 on board 112 may have a web server 119 and component 121 connected to remote comm/VPN connector 115. A function block engine may be situated in component 121 and have a direct digital control connection to remote comm/VPN connector 115. An HTTPS connection from remote comm/VPN connector 115 may go to a firmware (FW) update service and AB memory.

An IMX6 123 may be connected to an elliptic curve cryptography (ECC) 508 124.

These components may be substituted with similar components from different makers. A serial communication mgr 125 may be connected to an operating system (OS) processor 126 and to an encrypted file system 127. An ONX 128 and a Linux 129 may be connected to encrypted file system 127.

Serial com mgr 125 of board 112 may have a connection to a serial com mgr 131 of board 113. There is serial security between components 125 and 131 via a high speed (e.g., greater than one Gbps) channel 185 connecting components 125 and 131. Data that are static and moving between components may be encrypted.

Serial com mgr 131 may be connected to an encrypted file system 132. An IO driver 133 may be connected to encrypted file system 132. Driver 133 may provide an expansion bus (up to 16) to controller IO expansion component 134, and signals to X10 bus 135 and panel bus signals to a company's XL800 modules1 36. BACnet master-slave/token-passing (MSTP) signals may go from encrypted file system 132 to an RS 485 driver 137. Signals may go from encrypted file system 132 to a microset driver 138. Signals may also go from encrypted file system 132 to Sylk™ driver 139. An open real-time operating system (RTOS)-secure boot 141 may provide signals to encrypted file system 132 and to ECC 508 142. Mac address information from boot 141 may be provided to block 188.

A physical IO 181 may be associated with modules 136 and provide AI, DI, DO and AO terminals, which may connected to a variety of devices 182, for example, "20KNTC PT1000", "Switch, OCC, Fan Status", "Relays, Floating Motors", and "0-10V, 2-10V, 4-20 ma", respectively.

A hand-off-auto (HOA) board 184 may be connected to open RTOS-secure boot 141. One part of board 184 may reveal Power, Status and Service Request SW, with LED's. Another part of board 184 may reveal HOA control, and hand-off-auto switches. An H selection may enable an output to the web server, an O selection may disable an output to the web server, and an A selection may provide an automatic signal to the web server. With an A selection, the function block engine may be activated to output a signal or calculation command as directed by the automatic signal.

A connected controller 111 gateway 143 for firmware updates and a cloud connector, may provide HTTFS, advanced message queuing protocol signals (AMQPS) across internet boundary 117 to a controller 111 firmware update service component 145 of a cloud 144.

A USB host 147 may have a FOXs & HTTPS connection to a wireless encrypted dongle 148 with ECC 508. An HTTPS, FOXs connection may go from dongle 148 to a wireless encrypted router 149. A connection may go from a FW update device 151 to remote comm/VPN connector 115. A local HVAC operator station 152 may have a UI connection to FW update device 151 and a UI connection to a Niagara workbench 153 online/offline. A FOXs connection may go from remote comm/VPN connector 115 to Niagara workbench 153.

Figure 9B:
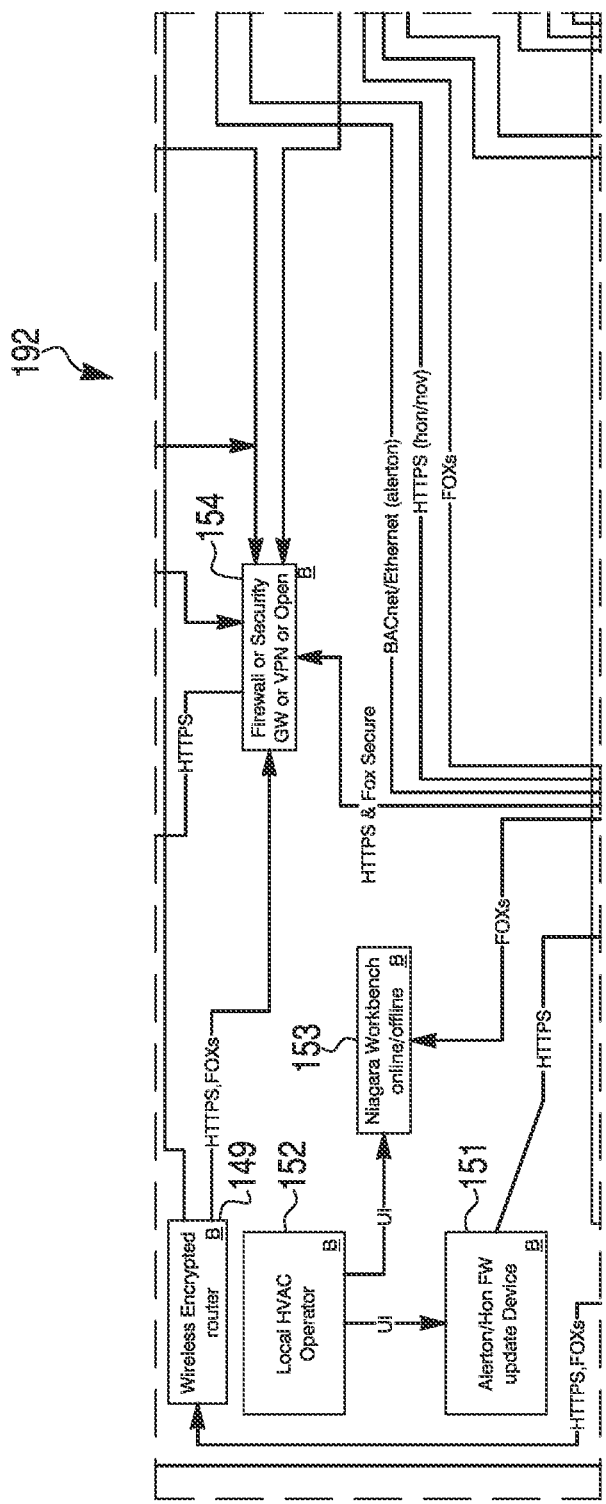

An HTTPS, FOXs may go from wireless encrypted router 149 to a firewall or security GW or VPN or open mechanism 154 shown in portion 192 of FIG. 9B. An HTTPS & FOX secure connection may go from remote comm/VPN connector 115 to mechanism 154 in portion 192 of FIG. 9B. A BACnet/Ethernet connection may go from remote comm/VPN connector 115 to factory 155. An HTTPS connection may go from remote comm/VPN connector 115 to factory 155.

Power over Ethernet (PoE) is a technology for wired Ethernet local area networks (LANs) that may allow the electrical current necessary for the operation of each device to be carried by the data cables rather than by power cords. This technology may be useful in expansion or chain connections of components such as subsystems, systems, controllers, and so forth.

Figure 9C:
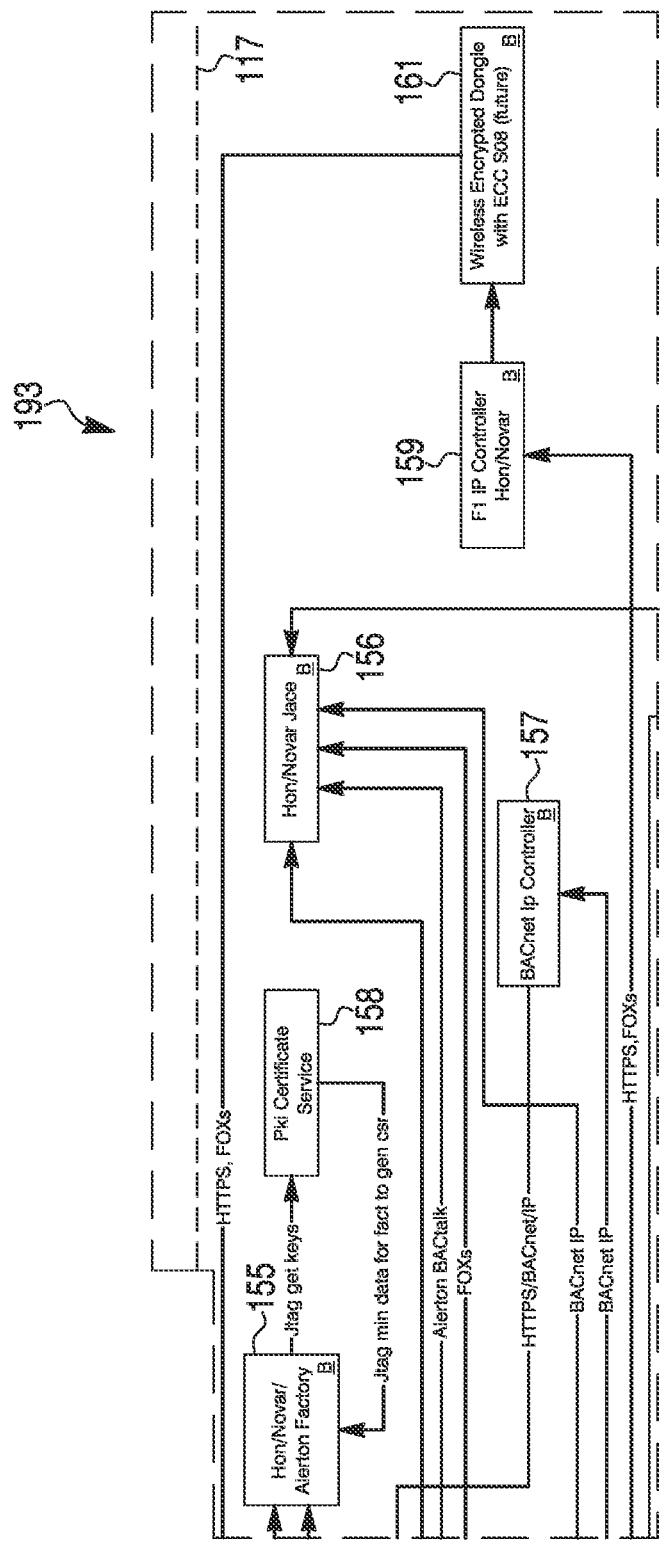
Figure 9D:
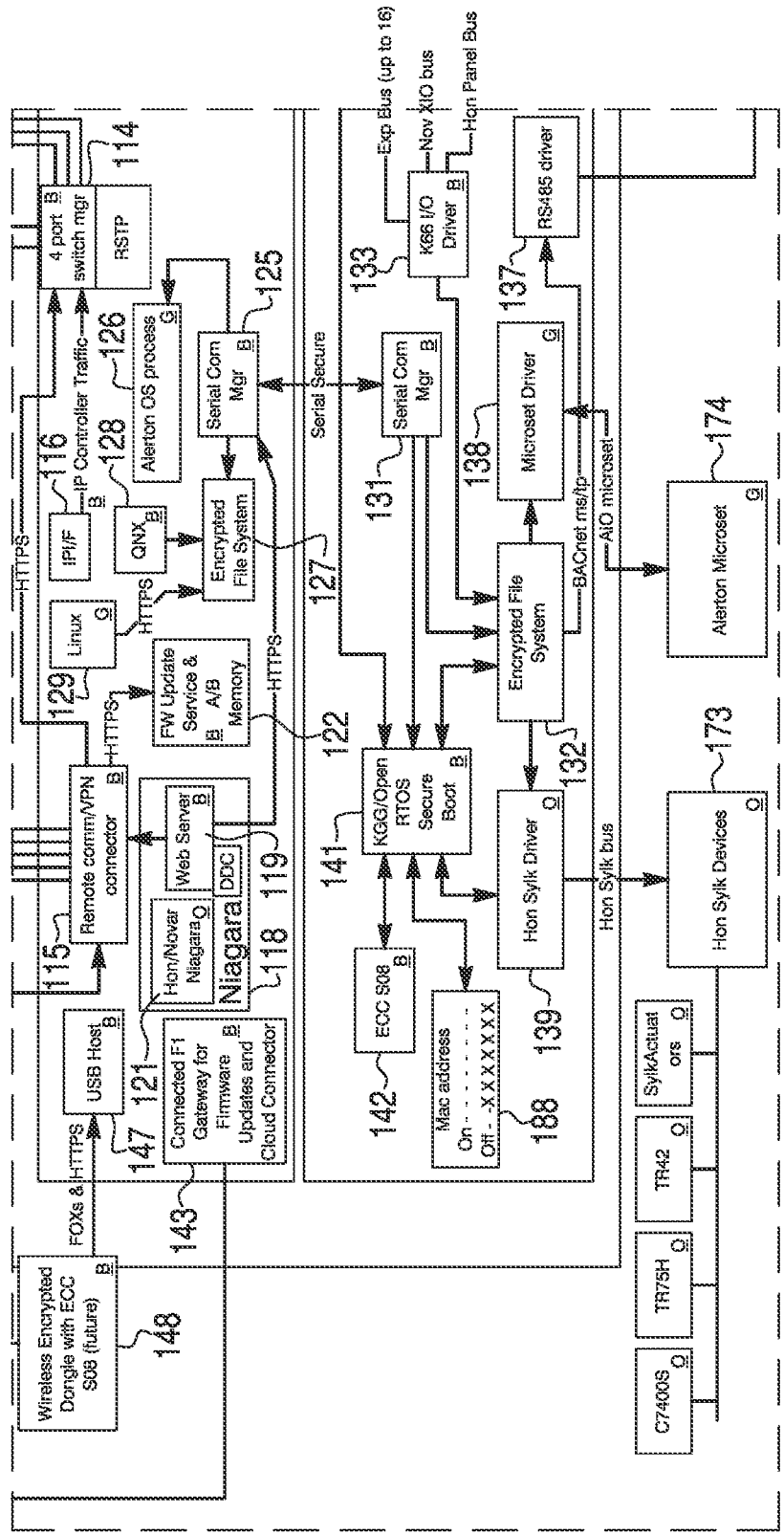
Figure 9E:
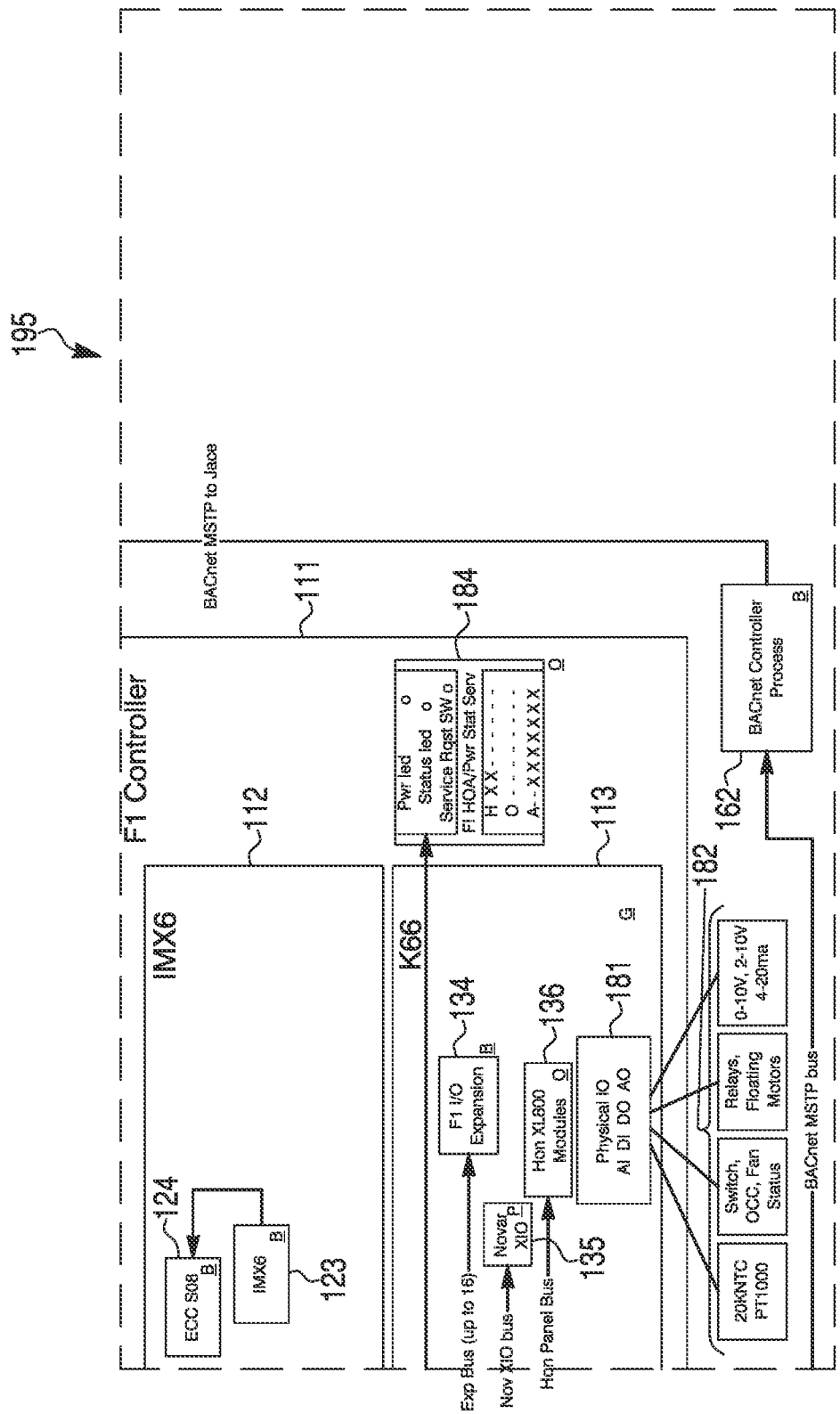

A FOXs connection may go from remote comm/VPN connector 115 to a JACE 156 as shown in portion 193 of FIG. 9C. A BACnet connection may go from four-port switch mgr 114 to JACE 156. A FOXs connection may go from switch 114 to JACE 156. A BACnet IP connection may go from switch 114 to JACE 156. A BACnet IP connection may go from switch 114 to a BACnet to controller device 157. An HTTPS/BACnet/IP connection may go from device 157 to mechanism 154. A "joint test action group (jtag) get Keys" connection may go from factory 155 to a public key infrastructure (Pki) certificate service module 158. A "jtag min data for fact to gen certificate signing request (csr)" connection may go from Pki service module 158 to factory 155. An HTTPS FOXs connection may go from switch 114 to controller 111 box 159. A connection may go from box 159 to a wireless encrypted dongle 161, with ECC 508. An HTTPS, FOXs connection may go from wireless encrypted router 149 to wireless encrypted dongle 161.

A BACnet MSTP bus connection may go from driver 137 to a BACnet controller process module 162 in portion 195 of FIG. 9E. A BACnet MSTP to JACE connection may go from module 162 to JACE 156.

A connection HTTPS may go from a sentinence 146 of cloud 144 to a view point history module 163 (e.g., of light commercial building solutions (LCBS) web client UI) in portion 191 of FIG. 9A. An HTTPS connection may go from a contractor user management web I/F SF.COM module 165 of a cloud 164 to module 163. An HTTPS connection may go from mechanism 154 to module 163. An HTTPS connection may go from module 163 to a web browser interface 167 of a module 166. A remote HVAC user device 168 may have a UI connection to web browser 167 and a UI connection to a Niagara workbench 169 of module 166. An HTTPS connection may go from web browser interface 167 to mechanism 154. An HTTPS connection may go from Niagara workbench 169 to a Niagara license server 171. A FOX Secure connection may go from workbench 169 to mechanism 154. A compass 172 may have a BACnet/IP connection to mechanism 154.

Sylk driver 139 may have a Sylk bus connection to Sylk devices 173, such as, for example, modules C7400S, TR75H, TR42, and actuators. Microset driver 138 may have an all in one (AIO) microset connection to a microset 174 set of devices.

To recap, a control system may incorporate an off-premise internet cloud and tool subsystem, an on-premise networking infrastructure and control subsystem, an internet protocol controller subsystem, an external bus device subsystem, and an input/output (IO) device subsystem. The internet protocol controller subsystem may relate to or be a specialty apparatus for one or more buildings such as, for example, a heating, ventilation, and air conditioning (HVAC) controller.

The external bus device subsystem may incorporate a local IO device communication subsystem.

The IO device subsystem may incorporate expansion IO devices and physical IO devices.

The off-premise internet cloud and tool subsystem may incorporate a Niagara™ license server connected to a Niagara workbench, a web browser interface connected to a firewall or security or virtual private network (VPN) or open module, and a remote HVAC user mechanism for operating the web browser interface or the Niagara workbench.

The on-premise networking infrastructure and control subsystem may incorporate a firewall or security or VPN or open module having a secure connection to a Niagara workbench, and a wireless encrypted router connected to the firewall or security or VPN or open module and connected to a wireless encrypted dongle, and a BACnet internet protocol (IP) controller connected to the firewall or security or VPN or open module.

The internal protocol controller subsystem may incorporate a remote communication VPN connector connected to a Niagara workbench online/offline, the firewall or security or VPN or open module, a factory and a Java™ application control engine (JACE™), a firmware (FW) updated service, a memory, and a multi or four port switch manager. The multi or four port switch manager may be connected to the JACE, a BACnet IP controller, an F1 IP controller, and/or a similar or equivalent controller, and the factory may be connected to a public key infrastructure (PKI) certificate service.

An approach for constructing a secure control system, may incorporate interconnecting an off-premise internet cloud and tool subsystem across an internet boundary with an on-premise networking infrastructure and control subsystem via one or more secure and non-secure connections, interconnecting the on-premise networking infrastructure and control subsystem with an internet protocol controller subsystem via one or more secure and non-secure connections, interconnecting the internet protocol controller subsystem with an external bus device subsystem via one or more secure and non-secure connections, and interconnecting the external bus device subsystem with an IO device subsystem.

The internet protocol controller subsystem may incorporate a direct digital control module connected to a web server and a processing platform. The web server may be connected to a remote communication virtual private network (VPN) connector and a first serial communication manager module.

The first serial communication manager module may be connected to a second serial communication manager via a secure connection.

The remote communication VPN connector may be connected to components of the on-premise networking infrastructure and control subsystem.

The remote communication VPN connector may be connected to a multi or four port switch manager of the internet protocol controller subsystem, and a firmware (FW) update service and a memory.

The four port switch may be connected via one or more secure and non-secure connections to a Java™ application control engine (JACE) module and to one or more internet protocol controller subsystem of the on-premise networking infrastructure and control subsystem.

At least one of the one or more internet protocol controller subsystems may be connected to a firewall or security or VPN or open module. The firewall or security or VPN or open module may be connected via one or more secure and non-secure connections to a cloud of the off-premise internet cloud and tool subsystem.

An apparatus for a secure direct digital control and integration control platform may incorporate an internet protocol controller subsystem having a direct digital control module, a web server, and a workstation platform operating subsystem interconnected with one another. The web server may be connected to a remote communication virtual private network (VPN) connector and to a first serial communication manager that is connected to an encrypted file system and has a secure connection to a second serial communication manager.

The apparatus may further incorporate an on-premise networking infrastructure and control subsystem having an online/offline workbench, a firewall or security or VPN or open module, a factory module and a Java™ application control engine (JACE) module connected via a secure or non-secure line to the remote communication VPN connector of the internet protocol controller subsystem.

The apparatus may further incorporate an off-premise internet cloud and tool subsystem having a cloud, a workbench and a web browser interface connected to the firewall or security or VPN or open module of the on-premise networking infrastructure and control subsystem. A remote heating, ventilation and air conditioning (HVAC) user interface may be connected to the web browser interface and the workbench.

The remote communication VPN connector of the internet protocol controller subsystem may be connected to a one Gbps or more multi-port switch manager module having a rapid spanning tree protocol (RSTP) block. The multi-port switch management may be connected to the JACE module via one or more of secure and non-secure connections.

The multi-port switch management module may be connected to at least one internet protocol controller of the on-premise networking infrastructure and control subsystem.

The internet protocol controller subsystem may have an input/output (TO) driver connected to an encrypted file subsystem and an open real-time operating system (RTOS) secure boot. The second serial communication manager may be connected to the encrypted file subsystem and the open RTOS secure boot. The open RTOS secure boot may be connected to a polarization-insensitive driver and which is connected to a polarization-insensitive bus for connection to one or more sensor devices and actuator devices. The encrypted file subsystem may be connected to one more drivers. The IO driver may be connected to one or more IO expansion modules and one or more physical IO modules.

Figure 10:
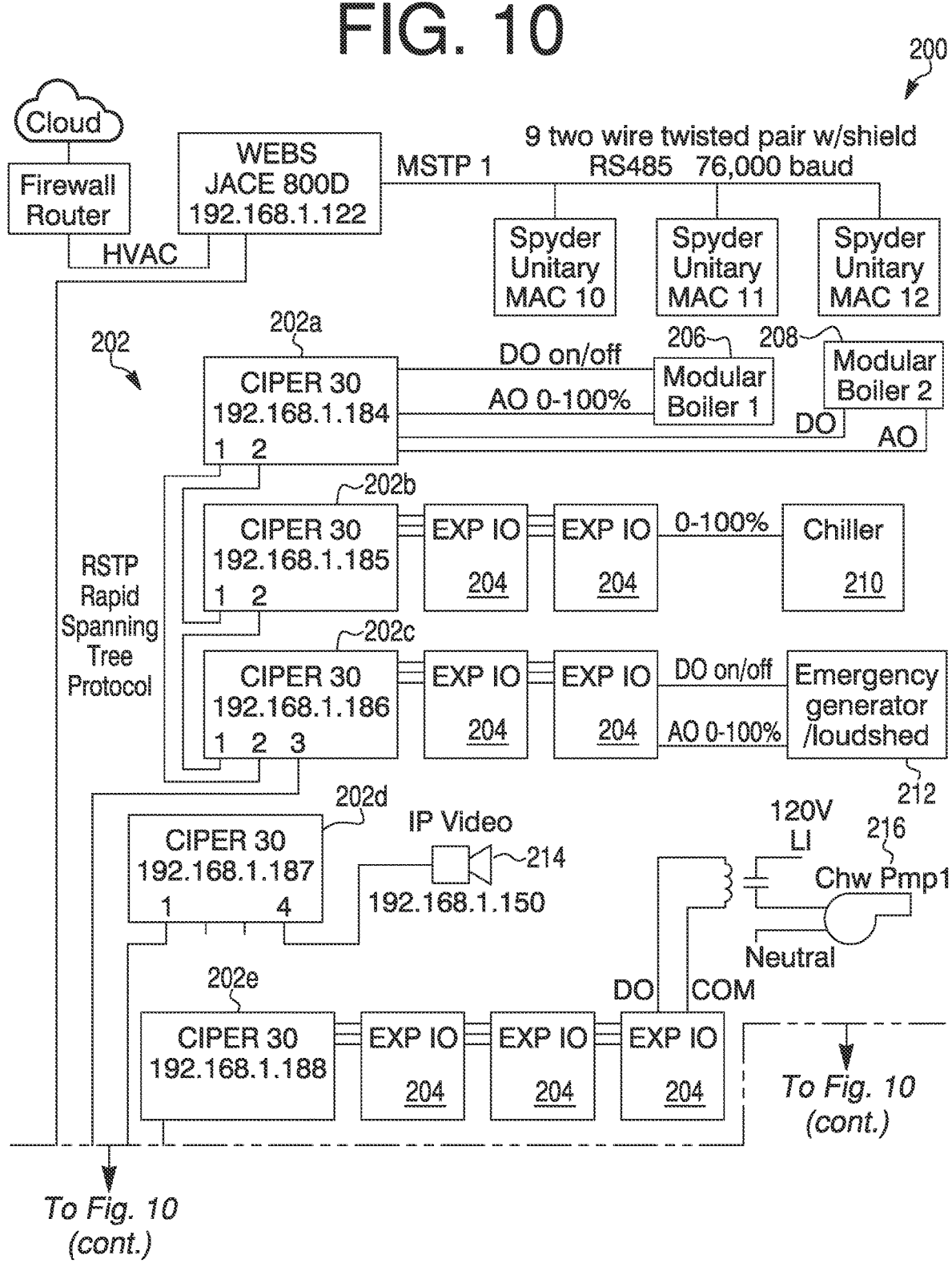
FIG. 10 is a schematic block diagram of an HVAC control system including a plurality of HVAC controllers and HVAC components.
Figure 10:
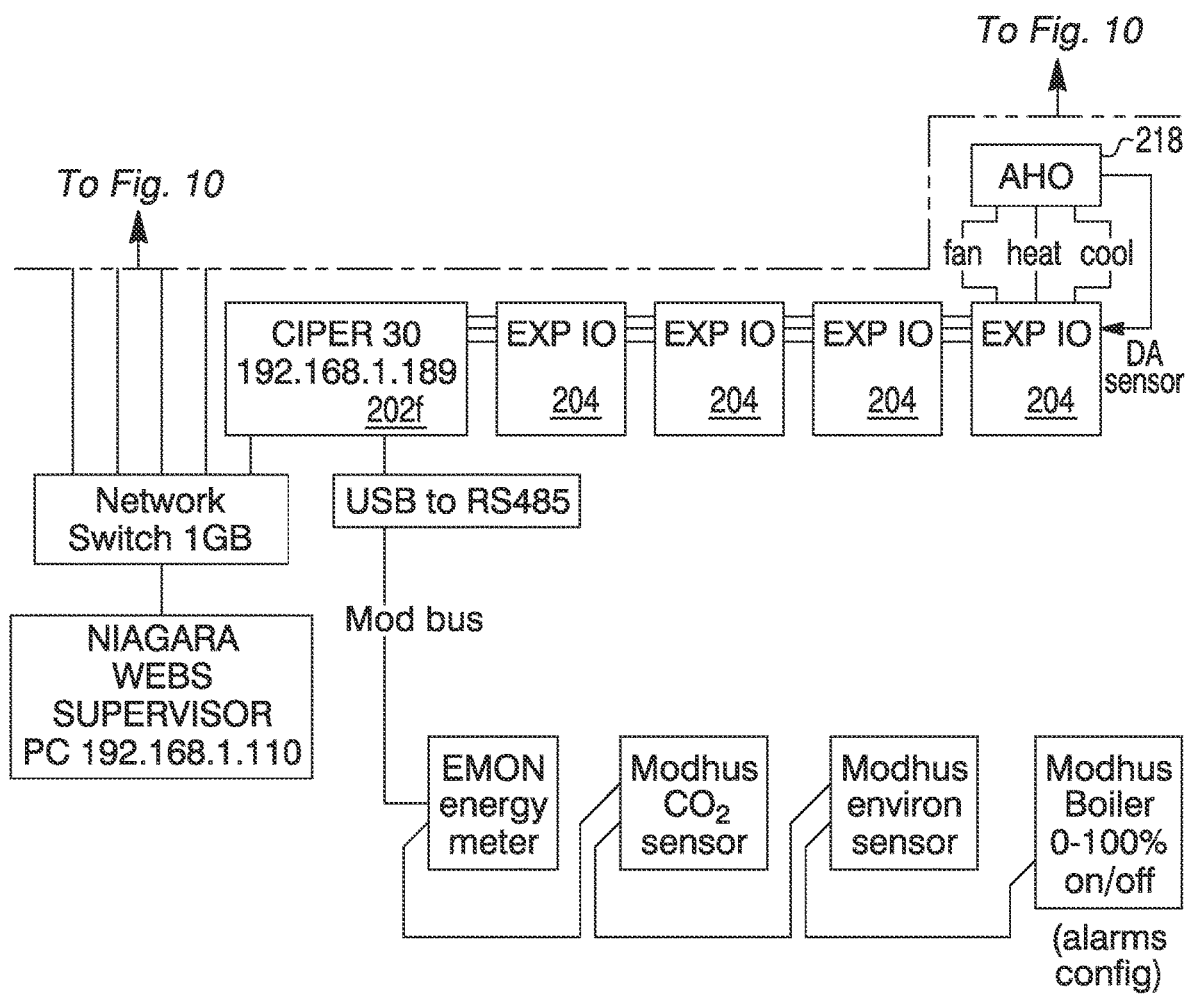

FIG. 10 is a schematic block diagram of an illustrative HVAC automation system 200 that includes a number of controllers 202 such as CIPer30/F1 controllers available from Honeywell International. Each of the number of controllers 202 may be considered as an example of HVAC controller 48, HVAC controller 34, HVAC controller 22 or even building controller 14. The controllers 202 are individually labeled as 202a, 202b, 202c, 202d, 202e, 202f. It will be appreciated that each of the illustrative controllers 202 may include both an event driven controller and a deterministic controller. Each of the controllers 202 are operably coupled with a number of expansion modules 204 that can be considered as being IO modules. Because each controller 202 only has a given number of input ports and output ports, the expansion modules 204 effectively give each of the controllers 202 to which they are connected a substantially greater number of available input ports and output ports. Each of the expansion modules 204 may be considered as including a deterministic controller, for example.

In the example shown, the controller 202a is operably coupled with a boiler 206 and a boiler 208 and thus is configured to control operation of the boiler 206 and the boiler 208. The controller 202b is operably coupled with a chiller 210 via several expansion modules 204 and thus is configured to control operation of the chiller 210. The controller 202c is operably coupled with an emergency power generator 212 via several expansion modules 204 and thus is configured to control operation of the emergency power generator 212. The controller 202d is operably coupled with a video camera 214 and thus is configured to control operation of the video camera 214. The controller 202e is operably coupled with a pump 216 and thus is configured to control operation of the pump 216. The controller 202e is operably coupled with an AHU (air handling unit) 218 via several expansion modules, and thus is configured to control operation of the AHU 218. It will be appreciated that the particular controller 202 controlling operation of each of the boiler 206, the boiler 208, the chiller 210, the emergency power generator 212, the video camera 214, the pump 216 and the AHU 218, respectively, is also responsible for generating and outputting the appropriate control values during any hold mode and any subsequent back off mode.

The controllers 202 may be considered as forming a Rapid Spanning Tree Protocol (RSTP) loop that enables communication both in a forward direction and in a backward direction within the loop. This can facilitate continued communication between the controllers 202 even if one of the controllers 202 suffers a power loss or other temporary irregularity that impacts operation of that particular controller 202. Thus, it will be considered that each controller 202 includes RSTP functionality built into the controller 202.

U.S. Pat. No. 10,200,203, issued Feb. 5, 2019; U.S. Pat. No. 8,375,402, issued Feb. 12, 2013; U.S. Pat. No. 9,726,392, issued Aug. 8, 2017; U.S. Pat. No. 8,983,632, issued Mar. 17, 2015; U.S. Pat. No. 8,954,543, issued Feb. 10, 2015; U.S. Pat. No. 8,650,306, issued Feb. 11, 2014; U.S. Pat. No. 8,418,128, issued Apr. 9, 2013; U.S. Pat. No. 8,239,500, issued Aug. 7, 2012; U.S. Pat. No. 8,112,162, issued Feb. 7, 2012; U.S. Pat. No. 7,826,929, issued Nov. 2, 2010; U.S. Pat. No. 7,738,972, issued Jun. 15, 2010; and U.S. Pat. No. 7,653,459, issued Jan. 26, 2010; are all hereby incorporated by reference. U.S. patent application Ser. No. 16/436,859, filed Jun. 10, 2019, and U.S. patent application Ser. No. 16/892,934, filed Jun. 4, 2020, are hereby incorporated by reference.

Any publication or patent document noted herein is hereby incorporated by reference to the same extent as if each publication or patent document was specifically and individually indicated to be incorporated by reference.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A method for controlling one or more output ports of an HVAC controller that is housed by an HVAC controller housing, wherein the one or more output ports are accessible from outside the HVAC controller housing, the method comprising:

in an operational mode, the HVAC controller applying control values to the one or more output ports of the HVAC controller to operate one or more HVAC components of an HVAC system;

the HVAC controller storing one or more current control values that are currently being applied by the HVAC controller to one or more output ports of the HVAC controller;

monitoring the operation of the HVAC controller for a malfunction of at least part of the HVAC controller itself;

when the malfunction of at least part of the HVAC controller itself is identified:

the HVAC controller entering a hold mode, wherein the hold mode includes:

the HVAC controller holding the one or more current control values on the one or more output ports of the HVAC controller in order to operate the one or more HVAC components of the HVAC system in accordance with the one or more current control values until the malfunction of the HVAC controller itself is corrected or a predetermined hold time expires, whichever occurs first; and when the malfunction of the HVAC controller itself is not corrected before the predetermined hold time expires, the HVAC controller entering a back off mode, wherein the back off mode includes:

the HVAC controller setting each of one or more control values on one or more output ports of the HVAC controller to a corresponding configurable back off value in order to operate one or more components of the HVAC system in accordance with the corresponding configurable back off values.

2. The method of claim 1, wherein in the hold mode, when the malfunction of the HVAC controller is corrected before the predetermined hold time expires, automatically returning to the operational mode.

3. The method of claim 1, wherein in the back off mode, when the malfunction of the HVAC controller is corrected, automatically returning to the operational mode.

4. The method of claim 1, wherein the HVAC controller comprises an event driven controller and a deterministic controller both within the HVAC controller housing, wherein the deterministic controller is in communication with and receives control inputs from the event driven controller and in turn applies the control values to the one or more output ports of the HVAC controller.

5. The method of claim 4, wherein the malfunction comprises a malfunction in the deterministic controller.

6. The method of claim 4, wherein the malfunction comprises a malfunction in the communication between the event driven controller and the deterministic controller.

7. The method of claim 4, wherein the event driven controller comprises a first operating system and the deterministic controller has a second operating system, wherein the second operating system is different from the first operating system.

8. The method of claim 7, wherein the first operating system supports a NIAGARA® control framework.

9. The method of claim 7, wherein the deterministic controller is implemented on a different printed circuit board than the event driven controller within the HVAC controller housing, with a communication path extending therebetween.

10. The method of claim 9, wherein monitoring the operation of the HVAC controller for a malfunction comprises monitoring for a heartbeat signal on the communication path.

11. The method of claim 1, wherein the malfunction is a crash of one or more of an operating system, a BIOS and an application program of the HVAC controller itself.

12. The method of claim 1, wherein the HVAC controller comprises one or more hand-off-auto (HOA) switches accessible from outside the HVAC controller housing, wherein in the back off mode, the one or more HOA switches are manually switchable to an "H" or "O" setting to manually overriding the configurable back off value on one or more of the output ports of the HVAC controller.

13. The method of claim 12, wherein a control value associated with the "H" setting of at least one of the HOA switches for overriding the configurable back off value of one or more of the output ports of the HVAC controller is programmable.

14. An HVAC controller housed by an HVAC controller housing, the HVAC controller having one or more output ports accessible from outside the HVAC controller housing for controlling one or more HVAC components of an HVAC system, the HVAC controller comprising:
one or more processors configured to:
in an operational mode, apply control values to one or more output ports of the HVAC controller to control one or more HVAC components of an HVAC system;
store one or more current control values that are currently being applied by the HVAC controller to one or more output ports of the HVAC controller;
monitor the operation of the HVAC controller for a malfunction of at least part of the HVAC controller itself;
when the malfunction of at least part of the HVAC controller itself is identified:
enter a hold mode, wherein while in the hold mode:
set and hold a first set of the one or more control values on the one or more output ports of the HVAC controller until the malfunction of the HVAC controller itself is corrected or a predetermined hold time expires, whichever occurs first; and
when the malfunction of the HVAC controller itself is not corrected before the predetermined hold time expires, enter a back off mode, wherein while in the back off mode:
set each of one or more control values on one or more output ports of the HVAC controller to a corresponding configurable back off value so that the one or more HVAC components of an HVAC system are operated in accordance with the corresponding configurable back off values.

15. The HVAC controller of claim 14, wherein:
in the hold mode, when the malfunction of the HVAC controller is corrected before the predetermined hold time expires, returning to the operational mode; and
in the back off mode, when the malfunction of the HVAC controller is corrected, returning to the operational mode.

16. The HVAC controller of claim 14, wherein the hold mode further comprises sending a signal to an emergency generator when a power failure has affected operation of the one or more HVAC components of the HVAC system.

17. The HVAC controller of claim 14, wherein the hold mode further comprises sending a signal requesting that an emergency controller that is configured to provide the first set of one or more control values proceed with providing the first set of one or more control values.

18. The HVAC controller of claim 14, wherein the predetermined hold time is programmable.

19. The HVAC controller of claim 14, wherein the HVAC controller comprises an event driven controller and a deterministic controller both within the HVAC controller housing, wherein the deterministic controller is in communication with and receives control inputs from the event driven controller and in turn applies the control values to the one or more output ports of the HVAC controller, and wherein the deterministic controller is implemented on a different printed circuit board than the event driven controller, with a communication path extending therebetween, and wherein monitoring the operation of the HVAC controller for a malfunction of at least part of the HVAC controller itself comprises monitoring for a heartbeat signal on the communication path.

20. A non-transitory computer readable medium storing instructions that when executed by one or more processors of an HVAC controller cause the one or more processors to:
in an operational mode, apply control values to one or more output ports of the HVAC controller to control one or more HVAC components of an HVAC system, wherein the HVAC controller is housed by an HVAC controller housing with the one or more output ports accessible from outside the HVAC controller housing;
store one or more current control values that are currently being applied by the HVAC controller to one or more output ports of the HVAC controller;
monitor the operation of the HVAC controller for a malfunction of at least part of the HVAC controller itself;
when the malfunction of at least part of the HVAC controller itself is identified:
enter a hold mode, wherein while in the hold mode:
hold one or more of the current control values on the one or more output ports of the HVAC controller until the malfunction of the HVAC controller itself is corrected or a predetermined hold time expires, whichever occurs first; and
when the malfunction of the HVAC controller itself is not corrected before the predetermined hold time expires, enter a back off mode, wherein while in the back off mode:
set each of one or more control values on one or more output ports of the HVAC controller to a corresponding configurable back off value so that the one or more HVAC components of an HVAC system are operated in accordance with the corresponding configurable back off values.

* * * * *